United States Patent [19]
Hopkins

[11] Patent Number: 5,757,918
[45] Date of Patent: May 26, 1998

[54] METHOD AND APPARATUS FOR USER AND SECURITY DEVICE AUTHENTICATION

[75] Inventor: W. Dale Hopkins, Gilroy, Calif.

[73] Assignee: Tandem Computers Incorporated, Cupertino, Calif.

[21] Appl. No.: 727,174

[22] Filed: Sep. 30, 1996

Related U.S. Application Data

[63] Continuation of Ser. No. 376,115, Jan. 20, 1995, abandoned.

[51] Int. Cl.$^6$ .............................. H04L 9/32; H04L 9/30; H04L 9/00
[52] U.S. Cl. ........................... 380/25; 380/4; 380/23; 380/24; 380/49; 380/30; 235/379; 235/380
[58] Field of Search ............................ 235/379, 380; 380/4, 23, 24, 25, 30, 49, 50

[56] References Cited

U.S. PATENT DOCUMENTS

| | | | |
|---|---|---|---|
| 4,650,980 | 3/1987 | Mizutani | 235/380 |
| 4,742,215 | 5/1988 | Daughters et al. | 235/380 X |
| 4,960,982 | 10/1990 | Takahira | 235/380 X |
| 4,992,646 | 2/1991 | Collin | 235/380 X |
| 5,030,806 | 7/1991 | Collin | 235/380 X |

OTHER PUBLICATIONS

Amos Fiat et al., "Unforgeable Proof of Identity," 5th Worldwide Congress on Computer and Communications Security and Protection, 1987, pp. 147–153.

Louis C. Guillou, "A Practical Zero–Knowledge Protocol Fitted to Security Microprocessor Minimizing Both Transmission and Memory," Lecture Notes in Computer Science, 1988, pp. 123–128.

R. L. Rivest et al., "A Method for Obtaining Digital Signatures and Public–Key Cryptosystems," Communications of the ACM, Feb. 1978, vol. 21, No. 2, pp. 120–126.

*Primary Examiner*—Bernarr E. Gregory
*Attorney, Agent, or Firm*—Graham & James LLP

[57] ABSTRACT

A new process is described for verifying a user and/or authenticating a smart card in an off-line computer environment with limited a priori knowledge on the part of the verifier. This process advantageously uses the computational capability and the physical and logical security characteristics offered by a smart card.

19 Claims, 3 Drawing Sheets

METHOD AND APPARATUS FOR USER AND SECURITY DEVICE AUTHENTICATION

This application is a continuation of application Ser. No. under 37 C.F.R. §1.62 of prior application Ser. No. 08/376, 115 filed Jan. 20, 1995 for "METHOD AND APPARATUS FOR USER AND SECURITY DEVICE AUTHENTICATION", now abandoned.

BACKGROUND OF THE INVENTION

1. Field of the Invention

The present invention relates to a method and apparatus for reliable electronic identification. More particularly, but without limitation, the present invention relates to the computerized identification of a smart card and smart card user.

2. Description of Related Art

Reliable electronic identification is highly useful in many situations. For example, the banking industry requires identification of automatic teller machine ("ATM") customers using security devices, typically banking cards. Various other types of security measures, for example those which grant or deny access to a building through an entry door, also rely upon identification of a card holder, frequently requiring the card holder to be in possession of a personal identification number ("PIN").

Because of their low cost, reliability and widespread availability, many of the above described security measures have traditionally been implemented with magnetic stripe cards. However, many of these security measures can be improved upon through the use of "smart cards." Smart cards are typically manufactured in the form of a traditional magnetic stripe credit or banking card. However, rather than (or in addition to) storing information on a magnetic stripe, smart cards include solid state electronic memory, a microprocessor and electrodes on the surface of the card which enable the microprocessor to communicate with a smart card reading terminal. The electronic memory within the smart card has greater memory capacity than traditional magnetic stripes. When this increased memory capacity is coupled with the computational ability of the microprocessor, smart cards may have much greater versatility and security then magnetic stripe cards.

Data Encryption Standard ("DES") technology is in widespread use throughout the world for personal verification and, in many instances, is implemented using smart cards. However, this technology requires that a secret encryption key also be present in the card and that the same secret key also be present in the terminal used to conduct the verification process. However, a potential disadvantageous aspect of this technology is that if the secret key or keys in the terminal are exposed, then the entire system, including all verification terminals and all cards, are compromised.

In the past, the DES-type approach has been reasonably acceptable when the authentication process is conducted in a highly secure environment. For example, the authentication process may be conducted by an electronic microprocessor securely housed within an ATM machine. Alternatively, if the ATM is on-line to a bank's main frame computer, then the verification process may be conducted remotely within a secure computer room in the bank.

In certain situations, however, it may be desireable to have authentication conducted off-line by a low-priced terminal. For example, merchants could benefit from eliminating the cost of telephone network connections between credit card company computers and point-of-sale (POS) devices. Such POS terminals must usually be inexpensive and, therefore, cannot be constructed with the same physical and electronic security features typical in more expensive banking environments, such as those discussed above. In particular, low-priced POS terminals may lack the security measures necessary for entrusting a secret key within such a device. Therefore, there is a need for a secure verification and authentication system and process, wherein a low cost off-line electronic terminal can authenticate that a card is not counterfeit and that the user is authorized. Preferably, since the verifying terminal will not be secure, it should be able to verify that both the card and the user are authentic without the terminal itself containing or receiving any non-public information during the verification and authentication processes. The present invention fulfills this need among others.

SUMMARY OF THE INVENTION

This invention provides, among other things, a method and apparatus for verifying the identity of a user of a security device. In a particular case, the present invention can be used to authenticate a smart card and the identity of its user in an off-line computer terminal environment wherein the off-line terminal has no secret information.

The process involves the interaction between two entities. These "entities" are referred to herein as the "prover" and the "verifier." For ease and clarity of explanation, the invention is described in the case where the prover is a smart card and the verifier is a computer terminal which includes a smart card reader. However, in the more general case, the prover may be any electronic entity, such as a personal computer or work station requesting access to a host computer or to, for example, a network. The verifying entity may simply be a software process that runs on the host computer to which access is requested, or it may be a separate device containing a microprocessor and/or hardwired circuitry for performing the verification process.

In any event, a fundamental characteristic of the present invention is that secret information exists within the prover but need not exist within the verifier. Moreover, the verification process can be completed without transferring such secret information (or values) between the prover and the verifier. Nevertheless, using the method of the present invention, the prover is able to prove to the verifier that it is, in fact, the authorized entity.

From a process standpoint, the overall invention includes two phases: the "personalizing" phase, wherein the smart card ("prover") is initialized for use in the system and the "verification and authentication phase," wherein a terminal ("verifier") verifies that the smart card ("prover") is authorized for access to the system and that the person using the smart card is authorized to use it.

In phase 1, the user is assigned a specific smart card and that smart card is personalized to the user. This personalization process activates the card for use in either an on-line or, preferably, an off-line electronic verification and authorization system. At the personalizing phase, the card is loaded with the following data:

U—The public identification of the user, such as the user's name, unique bank account number, etc.

e—Public key exponent n—Public key modulus aB—The product aB is preferably stored within the card in an encrypted format. The quantities a and B are secret values. The value of "a" depends upon the card issuer's private public key d, the values U and n, and the user's PIN P. The quantity B depends upon U, n, the user's secret PIN P and the card issuer's private public key d.

The computations used to define a may be done in a secure computer environment external to the smart card. The results of this computation and the other data values set forth immediately above are then downloaded to the smart card to complete the personalization process.

The second phase of the process, i.e., verification and authentication, occurs when a user attempts to gain access to a secure system or portion thereof. For example, a user may wish to withdraw money from a bank account at an ATM, or to purchase an item in a store equipped with a POS device. In either event, the smart card ("prover") and the POS terminal or ATM ("verifier") interact, as follows:

First, the user inserts the smart card into a reading device comprising a portion of or associated with the terminal. As previously explained, the smart card contains the value aB encrypted under the user's secret PIN. Therefore, the user must enter the correct PIN in order to obtain the value aB and initiate the process within the verifying terminal.

In the next step, the smart card generates a random variable x and then computes the value:

$$T = x^e \pmod{n}.$$

The value of T is transmitted to the terminal along with the smart card or user identification value, U.

The terminal then generates a random number, y, called a "challenge" number. The terminal sends the challenge number to the smart card. The smart card uses the PIN to decrypt the value for aB stored in its memory and uses y to generate the responsive value, S. S is a function of y, x, aB and n. S is transmitted to the terminal.

The terminal then computes a value, T', which is a function of y, n, S, e, and U. If T' equals T, the card is verified and the user is authenticated. Otherwise, the terminal knows that either the card or the user are unauthorized. In this latter case where the card or user are not authorized, access to the secured system, for example the ATM, network, building, etc., will be denied.

From a system standpoint, the invention comprises a central control facility, such as a main frame host computer at the facilities of the card issuer. This computer is equipped and configured with circuitry for communication with a highly secure peripheral computing device called a security module. The security module is programmed to perform certain calculations in a secure manner, as will be described in greater detail hereinafter. In particular, the security module computes the values a and B.

The system further includes a smart card reader or terminal, which may be located at a site remote from the host computer. The smart card terminal is also in communication with the host computer. The smart card terminal is equipped with encryption/decryption software and/or circuitry, and further circuitry for electrically connecting to and communicating with the circuitry of a smart card. The encryption/decryption circuitry of the smart card terminal is designed to decrypt signals received from the host computer and encrypt data received from the smart card prior to transmission back to the host. In this way, all communications between the smart card reading terminal and the host computer are secure.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
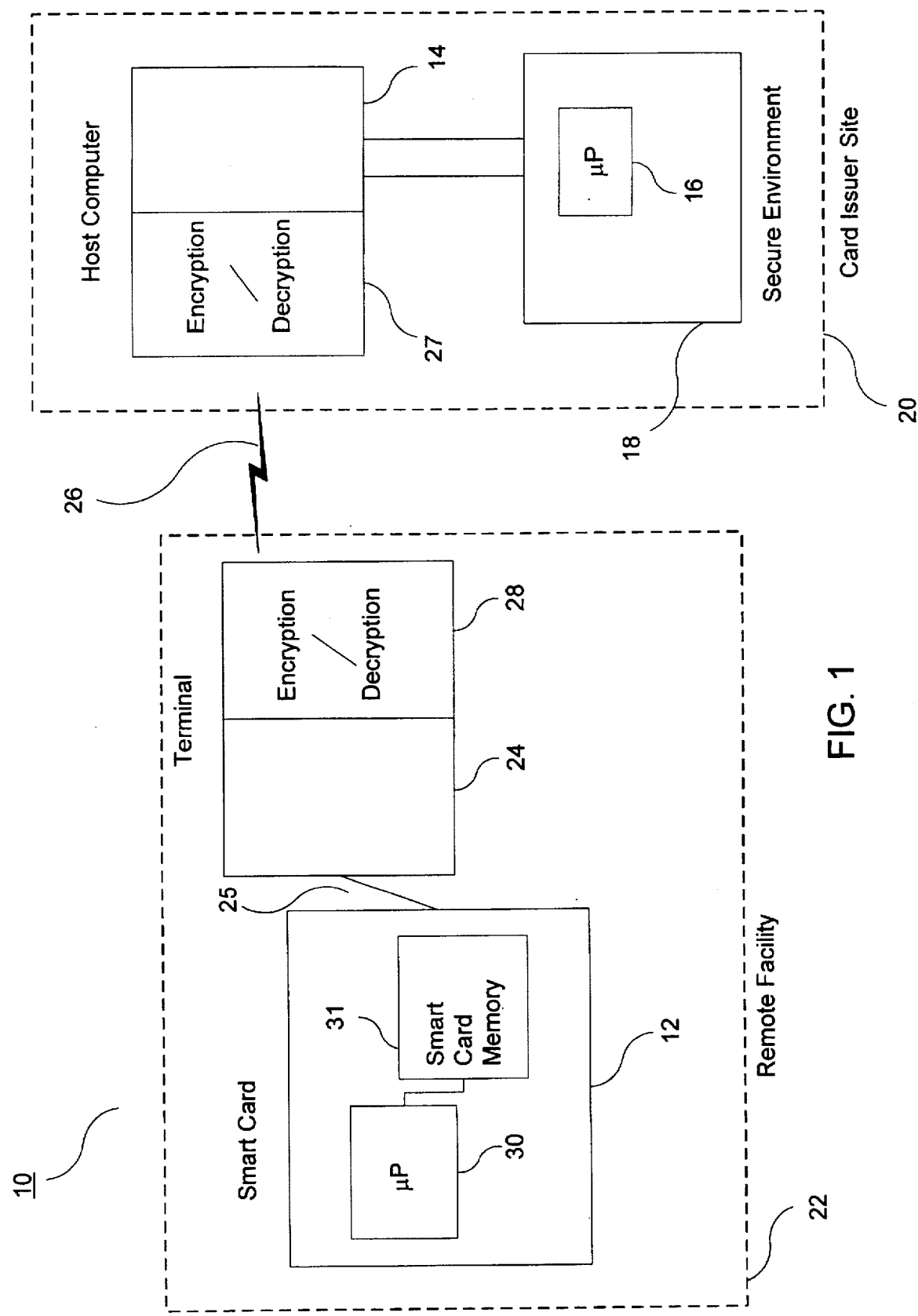
FIG. 1 is a block diagram illustrating the computerized system of the present invention utilized for personalizing a smart card.

FIG. 1 illustrates a presently preferred system 10 for personalizing a smart card 12. As shown in this figure, a portion 20 of the system 10 is typically owned and/or controlled by the issuer of the smart card 12. For example, this facility 20 may be located at the city headquarters of a bank. FIG. 1 also illustrates a remote, less secure facility 22, forming another portion of the system 10, such as a suburban branch of the bank from which the bank wishes to issue ATM access cards to its customers.

The secure facility 20 includes a general purpose programmable host computer 14. The host computer 14 may be, but is not necessarily, a main frame computer with a Non-Stop Kernel Operating System available from Tandem Computers Incorporated of Cupertino, Calif. USA. The system 10 also preferably includes a microprocessor 16 contained within and forming part of a highly secure physical and electronic environment 18, such as an A7000 Security Module available from Atalla Corporation of San Jose Calif. USA. Encryption/decryption circuitry and/or software 27 is provided for secure communications from the card issuer site over a network 26.

The remote facility 22 contains a terminal 24 for reading from and writing to smart cards 12. This remote facility 22 is in communication with the secure facility 20 over the network communications link 26. The terminal 24 contains encryption/decryption circuitry and/or software 28 so that all communications with the host 14 over the network 26 are secure. Encrypted data received over the network 26 is decrypted by the circuitry and software 28 before being sent from the terminal 24 to the smart card 12. Similarly, non-encrypted data received by the terminal 24 from the smart card 12 is encrypted by encryption circuitry 28 before transmission to the host 14. In this way, all transmissions from the terminal 24 to the host 14 are also secure.

The smart card 12 contains a microprocessor 30 and associated non-volatile read/write memory 31. The microprocessor 30 within the smart card 12 may be placed in communication with the card reader portion of terminal 24 via industry-standard connectors 25.

Personalizing the Smart Card

The computations outlined in this section take place at the time the card is personalized.

The card contains the following data which is entered at the time the card is personalized and issued. The card contains:

U—Public identification ("ID") of the user; Name, Unique ID (e.g., an account number). The card issuer may also choose to append a unique card identifier to this quantity, U. The terminal 24 must then be able to recognize that U has a valid data format structure. Thus, U may have a preamble, such as a card type, bank ID or other information that the terminal can recognize.

e—Public key exponent n—Public key modulus a—the product of the user's PIN, P and a digital signature on the product of U and the user's PIN. That is, $a \equiv P(UP)^d \mod n$, where d is the card issuer's private public key. The quantity "a" is a secret and is stored in the memory 31 of smart card 12 as a product, aB, where B is defined, as follows:

B—A secret chosen at the time the PIN, P is selected. The product aB is the only secret contained in the smart card and B is chosen to satisfy the following equation:

$$U^2 P^{e+1} B^e \equiv 1 \pmod{n} \tag{1}$$

Here n=pq where p and q are prime numbers. This linear congruence can be solved for B in the following way.

First, raise both sides of Eq.(1) to the power d, i.e., $$(U^2 P^{e+1})^d B^{ed} \equiv 1 \pmod{n} \tag{2}$$

From the Discrete Logarithm Theorem of number theory:

$$B^{ed} \equiv B^c \pmod{n}$$

if $z \equiv ed \pmod{\phi(n)} \equiv ed \pmod{\phi(p)\phi(q)} \equiv ed \pmod{(p-1)(q-1)}$ where $\phi(n)$ is the Euler totient function. Since p and q are primes, $\phi(p)=p-1$ and $\phi(q)=q-1$. Now e and d are defined by the RSA encryption algorithm so that $ed \equiv 1 \pmod{(p-1)(q-1)}$. Therefore, $$B^{ed} \equiv B \pmod{n}$$

So Equation (2) becomes $$(U^2 P^{e+1})^d B \equiv 1 \pmod{n} \tag{3}$$

Since n is the product of two primes p and q, the greatest common divisor of $(U^2 P^{e+1})^d$ and n is 1 so there exists a unique solution B. In other words, B is the multiplicative inverse of $(U^2 P^{e+1})^d$.

To solve this for B, multiply Equation (3) by $((U^2 P^{e+1})^d)^{\phi(n)-1}$ and use the Euler Generalization that says $((U^2 P^{e+1})^d)^{\phi(n)} \equiv 1 \pmod{n}$. Therefore a solution is $$B \equiv ((U^2 P^{e+1})^d)^{\phi(n)-1} \equiv 1 \pmod{n}$$

where $$\phi(n) = (p-1)(q-1).$$

This is an explicit solution available since p and q are known and can be retained in the security module 18 used in the personalization process. Otherwise, if p and q are not retained in the security module 18, then the Extended Euclidean Algorithm can be used to compute B.

The computations described immediately above are done in the security module 18 external to the smart card 12. The results of the computations and other data are then downloaded to the smart card 12 as part of the personalization process. The values a and B, however, are preferably encrypted by the security module 18 prior to transmission to the smart card. For example, this encryption may occur using a secret key $K_1$ and a DES algorithm. The encrypted values are then transmitted to terminal 24 by the host computer 14 over the network 26. Upon receipt by the terminal 24, the decryption software/circuitry 28 decrypts the a and B values using the same secret key, $K_1$, previously loaded into the terminal memory.

Personal Verification and Card Authentication

Figure 2:
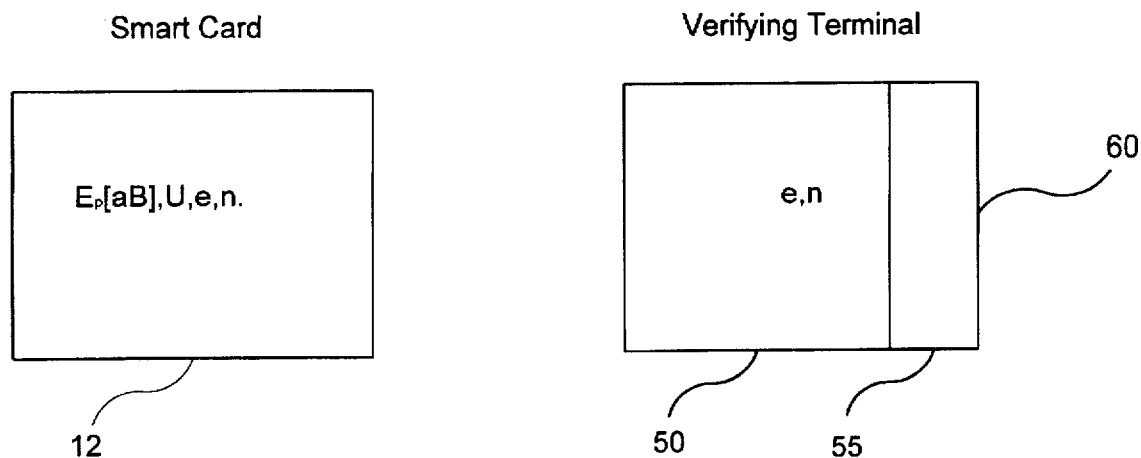
FIGS. 2-5 are block diagrams of a smart card and smart card reading terminal illustrating information contained within the smart card and terminal, respectively, at each stage of the authorization and verification process, and data communicated therebetween.

FIG. 2 illustrates the initial state of the verifying terminal 50 and smart card memory 31 following personalization.

The terminal 50 may be a POS device including a smart card reader and a microprocessor with associated memory programmed to compute the functions described herein. Whatever the composition of the terminal 50, the smart card 12 contains $E_p[aB]$, which is a cryptogram of aB encrypted under the users PIN, P. Therefore, the user must enter the correct PIN in order to obtain aB and initiate the process with the verifying terminal 50. PIN entry is preferably accomplished with a touch-tone key pad associated with the POS device.

Figure 3:
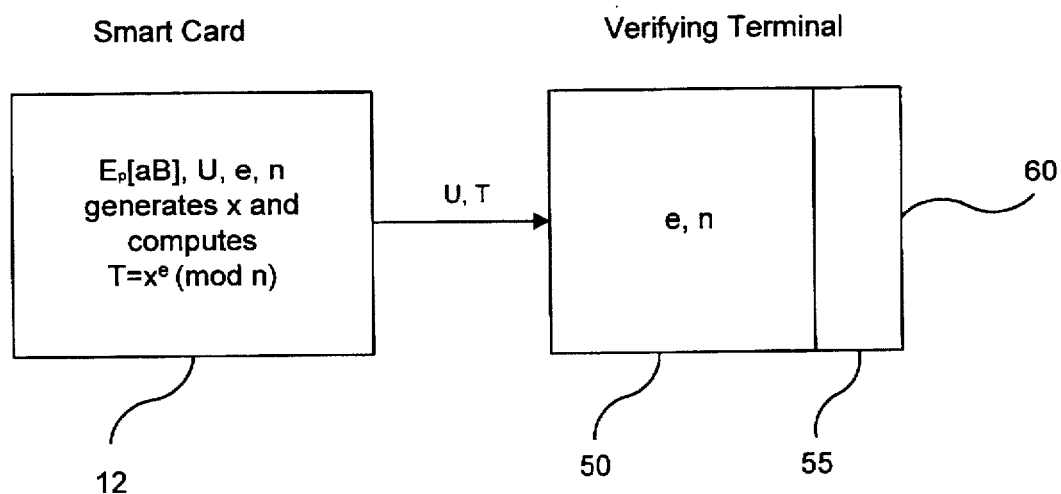

As illustrated in FIG. 3, the smart card microprocessor 30 generates a random variable, x, and then computes:

$$T = x^e \pmod{n}.$$

As further illustrated in FIG. 3, the smart card 12 transmits the value T to the terminal 50, along with the user identification value, U.

Figure 4:
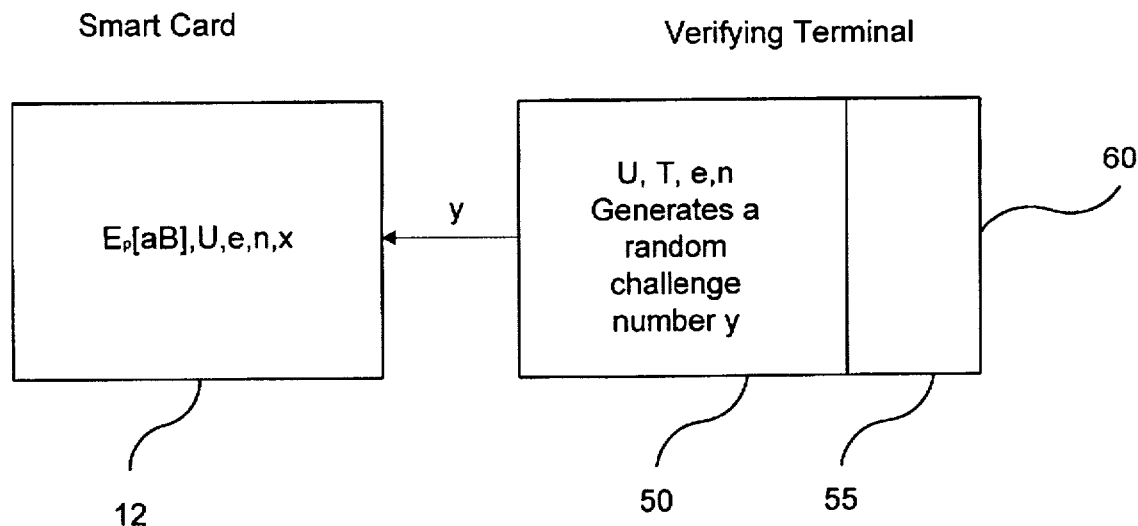

FIG. 4 illustrates that, following receipt of the U and T values, the terminal 50 generates a random challenge number, y, and sends y to the smart card 12.

Figure 5:
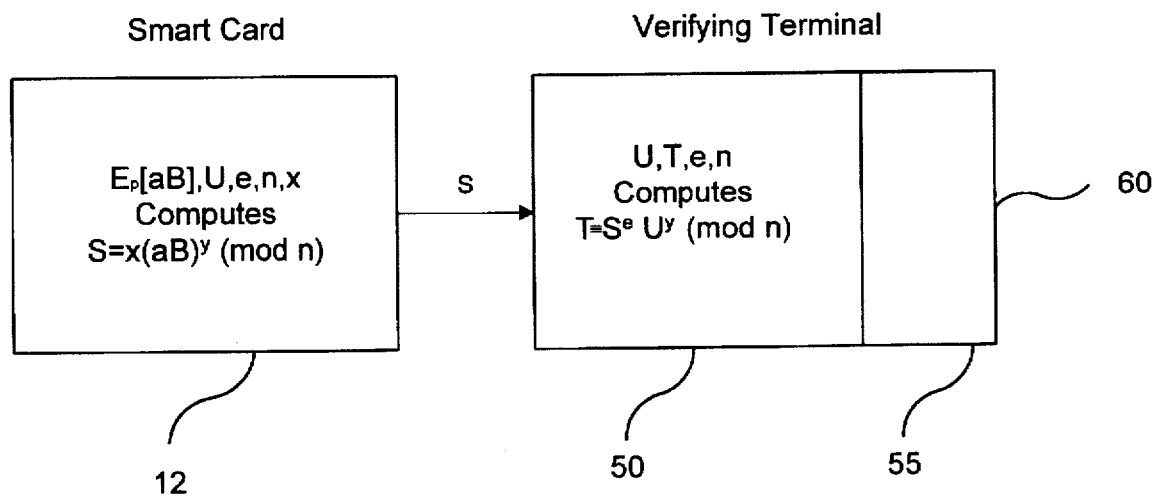

FIG. 5 illustrates that the smart card 12 uses the PIN, P, to decrypt $E_p[aB]$ and then uses aB and y to compute s, where:

$$S = x(aB)^y \pmod{n}.$$

FIG. 5 further shows that the smart card 12 sends the computed value, S, to the terminal 50.

Using the values for S, e, U, y and n, the terminal 50 computes a value, T', as follows:

$$\begin{aligned}
T' &\equiv S^e U^{2y} \pmod{n} \\
&\equiv (x(aB)^y)^e U^{2y} \pmod{n} \\
&\equiv x^e (a^e B^e)^y U^{2y} \pmod{n} \\
&\equiv x^e (U P^{e+1} B^e)^y U^{2y}.
\end{aligned}$$

This follows since:

$$a \equiv P(UP)^d \pmod{n}$$

and from the symmetric property of the RSA algorithm.

$$T' \equiv x^e (U^2 P^{e+1} B^e)^y \pmod{n}$$

But since from Equation (1);

$$U^2 P^{e+1} B^e \equiv 1 \pmod{n}.$$

Then T' becomes $$T' \equiv x^e \pmod{n}$$

But this is exactly T, so $$T' = T$$

Therefore, if T' equals T, then the user is verified and the card is authenticated because this relation will hold true only if Equation (1) is satisfied. This means that B, a, U, and the PIN, P satisfy the condition established at the time the customer selects a PIN and the smart card 12 is personalized. In all other case, T' will not equal T, the user is not verified, and the verifying terminal 50 is programmed to deny access in all such cases.

Each of FIGS. 2–5 illustrate an interface 55 which is in communication with the verifying terminal 50. Upon completion of the verifying and authentication procedures described above, the terminal 50 sends an "access denied" or "access granted" signal to the interface 55, depending upon whether T' is computed to be equal to T. The interface 55 then transmits an appropriate signal 60 to allow access (or not) to the building, money stored in the ATM, the network, etc., depending upon the nature of the facility which is the subject of the security procedures.

The above-described preferred embodiment of the invention offers a number of features which persons in the electronic security field will find useful and valuable. For example:

- The card must do two RSA exponentiations per transaction to authenticate a user, as shown above. However, the card does not need complete RSA capability. In fact, one exponentiation, namely $T=x^e \pmod n$, could be pre-computed and stored in the smart card for use in each transaction.
- The card issuer puts a secret into the card. However, this is not a secret key and the secret is not common to any other card.
- The card can do DES operations. One DES cycle is required in each transaction.
- The network controls user verification through a single public key exponent, e, and modulus, n. The e and n values are available to all terminals in the network. The private (i.e., secret) public key, d, corresponding to e and n is contained in a secure environment only at the card issuer site. The private public key, d, does play a role in the card personalization process, but is not present in the card or in the verification terminal, nor anywhere in the transaction processing network.
- There is no secret DES key in the verification algorithm. This means that all terminals 50 can verify the card 12 and the personal identification number, PIN, entered by the user without maintaining the secret key that is common to the card issuer's cards. The verifying terminal, 50, does not contain any secret keys or data that can be compromised and lead to the massive creation of counterfeit smart cards, 12.
- There is no PIN verification value, PVV, common to many ID card security systems, to be stored either in the card or on a database.
- The PIN is not stored in the clear in the card.
- There are no secret DES keys in the card.
- There are no private public keys in either the card 12 or the terminal 50.
- The card 12 contains two secret quantities, a and B. However, neither can be created by an adversary attempting to manufacture a counterfeit card. The secret quantities are unique to each card. Therefore, if one card is compromised, an adversary cannot create counterfeit cards.
- The disclosed process is a zero knowledge interactive proving scheme that is unique to each transaction. This attribute prevents the use of counterfeit cards that are programmed to mimic the protocol associated with a legitimate transaction.
- No secret data is exchanged between the smart card 12 and the terminal 50.
- The most extensive processing steps take place during the personalization phase described above. The computations done by the smart card 12 during the actual transaction are minimal and involve only one DES cycle and only two RSA exponentiations. The verifying terminal, 50, does one RSA exponentiation.
- An adversary cannot simply make a card which is physically identical to a valid card because the a and B values must be created as a function of the legitimate user's PIN, P, U and the private public key, d. Therefore, this function can only be created by the card issuer.

Authentication Process Without PIN Verification

The technique presented above provides simultaneous user verification and smart card authentication. However, certain security environments only require card authentication. Such environments can be easily accommodated with the present invention through a simple modification of the preferred embodiments described above.

In all process steps described above which include reference to a PIN number, the value of the PIN, P, is simply set equal to 1. Furthermore, the single DES cycle is eliminated because aB will now be stored in unencrypted form. These two modifications to the process described above eliminate the need for the user to enter a PIN number.

Data Signature Algorithm

A data signature is created using the mathematical structure shown in the card authentication algorithm.

If the card wants to send data, D, to the terminal it must generate a random variable, x, as before and compute:

$$T=(xh)^e \bmod n.$$

where h=H(D) is a hash on the data. The card sends U, D and T to the terminal. The terminal then generates a random challenge, y, and sends it to the card.

The card then computes $$S=x(aB)^y \bmod n.$$

The card then sends S to the terminal. Here S and T are the signature on the data.

The terminal computes a candidate hash h'=H(D) on the data and then computes $$T'=S^e U^y (h')^e \bmod n.$$

An analysis similar to that discussed previously applies here so that if T=T' then h=h', i.e., the hash computed by the card is equal to the hash computed by the terminal. Furthermore, a valid card provided the data since B was chosen as the multiplicative inverse of $(U^2 P^{e+1})^d$ during the personalization process.

Several preferred embodiments of the present invention have been described, nevertheless it will be understood that various modifications may be made without departing from the spirit and scope of the invention. For example, the security device need not be in the form of a smart card. Instead, the security device may be contained in any portable electronic form capable of carrying out the computations and storing the data described herein. In instances where electronic rather than physical access is required, the "prover" entity may be embodied in a software process within a stationary computer in communication with the verifier. Many other variations will be apparent to those of ordinary skill in the art based upon the foregoing description. Thus, the present invention is not limited to the preferred embodiments described herein, but may be altered in a variety of ways apparent to persons skilled in the art.

What is claimed is:

1. A method for granting or denying access to a secure facility based upon the verification of a user and authentication of a smart card in an off-line computer environment including personalizing means for transmitting data to the smart card and verifying means for verifying the identity of the smart card user and authenticity of the smart card, comprising the steps of:

a. transmitting, by the personalizing means, a user ID, public key exponent, public key modulus and a secret derived from the card issuer's private public key to the smart card;

b. storing the user ID, public key exponent, public key modulus and secret into a memory of the smart card;

c. using a random number generator contained within the smart card to generate a random number;

d. transmitting a value derived from the random number from the smart card to the verifying means, the verifying means including a verifying terminal having a smart card reading facility;

e. generating a challenge value at the verifying terminal and transmitting the challenge value to the smart card;

f. generating and transmitting, by the smart card, a signal to the verifying terminal based upon the public key modulus, the secret, the random number, and the challenge value;

g. determining at the verifying terminal, in accordance with the signal, whether the smart card is authentic and the user is valid; and h. if the user and smart card are determined to be valid and authentic, granting access to the secure facility, and if either the smart card is not authentic or the user is not valid, than denying access to the secure facility.

2. The method of claim 1, wherein the steps c–h are performed each time a user attempts to gain access to the secure facility using a smart card.

3. The method of claim 1, wherein the steps a and b are performed once, at a time when the smart card is issued to the user.

4. The method of claim 1, further including the step of requesting the user to enter a PIN number.

5. The method of claim 4, further including the steps of encrypting, by the personalizing means, the secret using the user's correct PIN number when the card is issued to the user; and decrypting, by the smart card, the secret using the PIN number entered by the user.

6. The method of claim 1, wherein the first transmitting step includes the steps of:

performing, by a processor of the personalizing means, operations to obtain values a and B, where the values a and B are derived from the card issuer's private public key, a PIN number, and the user ID; and transmitting, by the processor of the personalizing means, the values a and B to the personalizing means.

7. The method of claim 6, further including the steps of:

encrypting, by the processor of the personalizing means, the values a and B before they are transmitted to the smart card; and decrypting the transmitted encrypted values of a and B before they are stored in the memory of the smart card.

8. The method of claim 7, wherein the encrypting step includes the step of encrypting, by a processor of the personalizing means, the values a and B using the DES algorithm.

9. The method of claim 8, wherein the processor of the personalizing means is included within an A7000 Security module.

10. The method of claim 6, wherein the performing step includes the steps of:

storing a prime number p and a prime number q in a memory of the personalizing means; and multiplying p by q to obtain the public key modulus, wherein the step of performing operations to obtain the value B is further performed in accordance with the public key modulus.

11. The method of claim 1, further including the steps of:

encrypting, by the personalizing means, the secret using a PIN number of "1" when the smart card is issued to the user; and decrypting, by the smart card, the secret using a default PIN number of "1" prior to step f.

12. A method of providing and verifying a digital signature for data sent from a smart card in an off-line computer environment including personalizing means for transmitting data to the smart card and verifying means for verifying the digital signature from the smart card, comprising the steps of:

a. transmitting, by the personalizing means, a user ID, public key exponent, public key modulus and a secret derived from the card issuer's private public key to the smart card;

b. storing the user ID, public key exponent, public key modulus and secret into a memory of the smart card;

c. using a random number generator contained within the smart card to generate a random number;

d. transmitting the data, a value derived from the random number and the data, and the user ID from the smart card to the verifying means, the verifying means including a verifying terminal having a smart card reading facility, the derived value forming a first part of the digital signature;

e. generating a challenge value at the verifying terminal and transmitting the challenge value to the smart card;

f. generating and transmitting, by the smart card, a signal to the verifying terminal by the smart card based upon the public key modulus, the secret, the random number, and the challenge value, the signal forming a second part of the digital signature;

g. determining at the verifying terminal, in accordance with the signal, whether the smart card has sent an authentic digital signature for the data.

13. A method for verifying a right to access a secure facility based upon the verification of a user and authentication of a smart card in an off-line computer environment including verifying means for verifying the identity of the smart card user and authenticity of the smart card, comprising the steps, performed by the smart card, of:

storing in a memory of the smart card a user ID, a public key exponent, a public key modulus and a secret;

using a random number generator contained within the smart card to generate a random number;

transmitting a value derived from the random number from the smart card to the verifying means;

receiving, from the verifying means, a challenge value; and generating and transmitting, to the verifying terminal, a signal based upon the public key modulus, the secret, the random number, and the challenge value, the signal indicative of whether the user is verified and the smart card is authentic.

14. A method for authentication of a smart card in an off-line computer environment including verifying means for verifying the identity of the smart card user and authenticity of the smart card, the smart card storing in a memory a user ID, public key exponent, public key modulus and a secret derived from the card issuer's private public key, the method comprising the steps performed by the verifying means of:

receiving from the smart card a value derived from a random number generated by the smart card;

generating a challenge value;

transmitting the challenge value to the smart card;

receiving from the smart card a signal based upon the public key modulus, the secret, the random number, and the challenge value; and determining in accordance with the signal, whether the smart card is authentic and the user is valid.

15. A system for verifying a right to access a secure facility, comprising:

a smart card, including a memory, wherein the memory contains a secret, which constitutes secret information, and a public key exponent and a user ID, and a public key modulus, which constitute non-secret information;

a smart card reading and verifying terminal having a terminal memory containing only the non-secret information, said reading and verifying terminal being in the electronic communication with the smart card; and verifying means, coupled to the reading and verifying terminal, for authenticating the smart card based upon electronic communication between the smart card and the terminal, wherein said terminal memory contains only the non-secret information during the verification process and wherein the electronic communication does not transmit the secret information.

16. The system of claim 15, wherein the verifying means includes:

receiving means for receiving from the smart card the user ID and a value derived from a random number generated by the smart card;

means for generating a challenge value;

means for transmitting the challenge value to the smart card;

means for receiving from the smart card, a signal based upon the public key modulus, the secret, the random number, and the challenge value; and means for determining, in accordance with the signal, whether the smart card is authentic and the user is valid.

17. The system of claim 15, wherein the personalizing means includes:

means for performing operations to obtain values a and B, where the values a and B are derived from the card issuer's private public key, a PIN number, and the user ID; and means for transmitting the values a and B to the smart card.

18. The system of claim 15, further including means for allowing the user to enter a PIN number.

19. The system of claim 18, further including means for encrypting, in the personalizing means, the secret using the user's correct PIN when the card is issued to the user; and means for decrypting, in the smart card, the secret using the PIN entered by the user.

* * * * *